(No Model.)
F. G. & A. C. SARGENT.
WOOL WASHING MACHINE.
No. 260,899. Patented July 11, 1882.
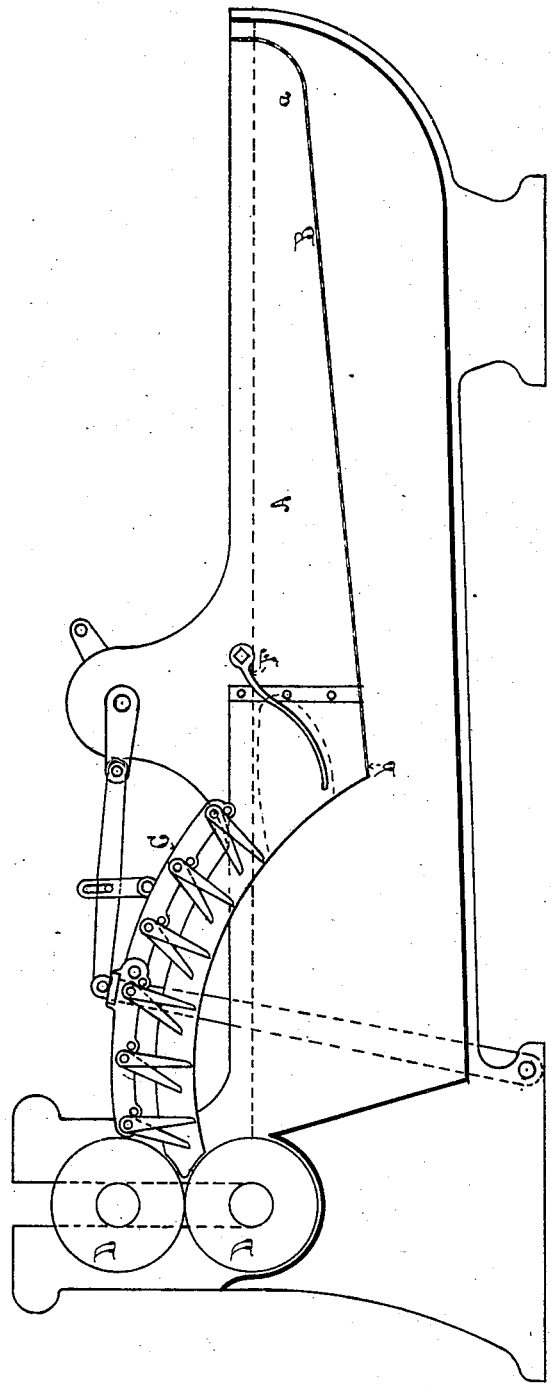
Witnesses
N. P. Ockington.
Geo. H. White
Inventor,
Frederick G. Sargent.
Allan C. Sargent.
by their Atty
Lepine ?

UNITED STATES PATENT OFFICE.

FREDERICK G. SARGENT AND ALLAN C. SARGENT, OF GRANITEVILLE, MASS.

WOOL-WASHING MACHINE.

SPECIFICATION forming part of Letters Patent No. 260,899, dated July 11, 1882.

Application filed March 2, 1882. (No model.)

*To all whom it may concern:*

Be it known that we, FREDERICK G. SARGENT and ALLAN C. SARGENT, of Graniteville, in the county of Middlesex and State of Massachusetts, have invented a new and useful Wool-Washing Machine, of which the following is a specification.

Our invention relates to that class of machines having a bowl or basin into which the scouring-liquid is placed, and into which the wool is put in considerable quantity and permitted to soak for a considerable time before it is withdrawn; and its object is to provide a bowl in which the wool will be moved through the scouring-liquid without the use of mechanism or hand-labor. We accomplish this by the device illustrated in the accompanying drawing, in which—

A is the bowl, provided with the false bottom B, made perforated to permit the scouring-fluid to readily pass through it. This bottom is inclined from the end *a* toward the end *b*, so that the wool put into the bowl at the end *a* will, as it becomes saturated with the scouring-liquid, and that already in the bowl is taken out at the end *b*, gradually slide down the inclined bottom toward the carrier C, which is constructed and operated substantially as described in Patent No. 250,758.

D D are the ordinary squeeze-rolls.

F is a swing rake or grating, which prevents the carrier C from drawing too much of the wool out of the tank at one time.

Heretofore machines of this class have been constructed with a false bottom which was horizontal, and the wool was moved forward in the bowl by some mechanism which operated upon it to move it forward toward the carrier to keep a constant supply within reach of it.

We have discovered that if a slight inclination be given to the bottom of the basin the wool, after becoming saturated with the scouring-liquid in the bowl, will follow down toward the carrier each time the carrier takes any out of it, so that after the bowl is filled with the liquid and the wool to be washed the carrier will be supplied continuously with wool in proper quantity so long as the attendant supplies the bowl at the feed end, and the wool will be permitted to soak for a considerable period of time, proportionate to the speed given the carrier to remove it. We thus produce a machine of great simplicity, especially adapted to prepare the wool by long soaking to be thoroughly cleansed in other machines which are provided with a mechanism to actively agitate and stir it while it passes through them. As there is no mechanism required to move the wool through the bowl, it can be made of any desired length without great expense, and this soaking-machine will so perfectly permit the scouring-liquid to act on the dirt by reason of the length of time the wool is in the basin that much less subsequent washing is required than when it is put through small machines, when it cannot soak a sufficient length of time to thoroughly loosen the dirt before it is undertaken to remove it.

What we claim as new and of our invention is—

A wool-washing machine having a bottom which has a downward inclination from the place the wool is fed into it to the point where it is taken by the carrier, whereby it is adapted to feed the wool forward to the carrier by gravity alone, substantially as described.

F. G. SARGENT.
A. C. SARGENT.

Witnesses:
DAVID HALL RICE,
LEPINE C. RICE.